United States Patent
Bagwell (10) Patent No.: US 12,045,354 B2
(45) Date of Patent: Jul. 23, 2024

(54) SMART NETWORK INTERFACE CARD-BASED INLINE SECURE COMMUNICATION SERVICE

(71) Applicant: Verizon Patent and Licensing Inc., Basking Ridge, NJ (US)

(72) Inventor: Myron Eugene Bagwell, Southlake, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 150 days.

(21) Appl. No.: 17/101,193

(22) Filed: Nov. 23, 2020

(65) Prior Publication Data

US 2022/0164451 A1    May 26, 2022

(51) Int. Cl.
G06F 21/60    (2013.01)
G06F 9/455    (2018.01)
H04L 9/08    (2006.01)
H04L 9/32    (2006.01)
H04L 9/06    (2006.01)

(52) U.S. Cl.
CPC ............ *G06F 21/602* (2013.01); *G06F 9/455* (2013.01); *H04L 9/0894* (2013.01); *H04L 9/3268* (2013.01); *H04L 9/0618* (2013.01)

(58) Field of Classification Search
CPC ..... G06F 21/602; G06F 9/455; H04L 9/0894; H04L 9/3268
USPC ......................................................... 713/156
See application file for complete search history.

(56) References Cited

U.S. PATENT DOCUMENTS

| | | | |
|---|---|---|---|
| 10,997,106 B1 * | 5/2021 | Bandaru | G06F 13/385 |
| 2008/0141022 A1 * | 6/2008 | Hu | G06F 21/72 713/153 |
| 2013/0281055 A1 * | 10/2013 | Patefield-Smith | G06F 21/602 455/411 |
| 2020/0127981 A1 * | 4/2020 | Yang | H04L 63/068 |
| 2020/0259799 A1 * | 8/2020 | Li | H04L 9/0897 |
| 2021/0119930 A1 * | 4/2021 | Debbage | H04L 1/1642 |

* cited by examiner

*Primary Examiner* — Dant B Shaifer Harriman
*Assistant Examiner* — Phuc Pham (57) ABSTRACT

A method, a device, and a non-transitory storage medium are described in which a SmartNIC-based inline secure communication service is provided. The service is provided by a SmartNIC. The SmartNIC-based inline secure communication service includes encryption and decryption of traffic originating from and destined to virtual devices of a device.

20 Claims, 9 Drawing Sheets

SMART NETWORK INTERFACE CARD-BASED INLINE SECURE COMMUNICATION SERVICE

BACKGROUND

Secure communication between nodes, network functions, end devices, and network devices may be an essential component for providing a service, an application, or other type of asset.

DETAILED DESCRIPTION

The following detailed description refers to the accompanying drawings. The same reference numbers in different drawings may identify the same or similar elements. Also, the following detailed description does not limit the invention.

Secure communication between nodes, network functions, end devices, and network devices may be an essential component for providing a service, an application, or other type of asset. The provisioning of secure communications among vendors can result in disparate configurations relating to encryption, authentication, data integrity, and/or other facets of security measures. As an example, a network function (NF) of a vendor may include an application using Internet Protocol Security (IPSec), Secure Socket Layer (SSL), Transport Layer Security (TLS), Datagram TLS (DTLS), or other protocol. Additionally, the network function may be configured to use one of many types of encryption algorithms, such as symmetric encryption algorithms (e.g., Advanced Encryption Standard (AES), Data Encryption Standard (DES), International Data Encryption Algorithm (IDEA), Rivest Cipher 4, 5, or 6, or other type), asymmetric encryption algorithms (e.g., Rivest-Shamir-Adleman (RSA), XTR, ElGamal, or other type), or other types of support systems (e.g., Certificate Authority (CA), Intermediate CA (ICA), Public Key Infrastructure (PKI), or other type).

Aside from configuration disparities that exist, various resources (e.g., processor, memory, etc.) of the network function, network device, end device, or node may be subject to the resource burden that supports the secure communication for inbound and outbound data. A network provider or other entity that includes or hosts such devices may be subject to added monetary costs associated with licenses or software fees to implement a node, such as a TLS sidecar proxy, with a network function or other type of device to ensure secure communication with other network functions or other types of devices.

According to exemplary embodiments, a SmartNIC-based inline secure communication service is described. According to an exemplary embodiment, the SmartNIC-based inline secure communication service may be implemented by a SmartNIC, a data processing unit (DPU)-based NIC, an Intelligent NIC (iNIC), a programmable NIC, a programmable network adapter, or other type of hardware (e.g., an Application-Specific Integrated Circuit (ASIC), a System-on-a Chip (SoC), a field-programmable gate array (FPGA), or other suitable form factor), which is referred to herein simply as a "SmartNIC". According to an exemplary embodiment, the SmartNIC is hardware (or a device) that is separate and apart from the hardware resources upon which a virtualized device, such as a network function or other node, runs or operates on. In this way, for example, the SmartNIC may offload tasks that may otherwise be performed by resources of the virtualized device.

According to an exemplary embodiment, the SmartNIC-based inline secure communication service may include encryption and decryption services. According to other exemplary embodiments, the SmartNIC-based inline secure communication service may include other security-related services, such as authentication, data integrity, nonrepudiation, and/or authorization services, for example. According to still other exemplary embodiments, the SmartNIC-based inline secure communication service may include other communication services, such as protocol processing, flow monitoring, compression/decompression, load balancing, and so forth.

According to an exemplary embodiment, the SmartNIC may include cipher logic. The cipher logic may receive all inbound and outbound traffic and provide encryption and decryption services to externally developed application packages, as described herein. According to an exemplary embodiment, the SmartNIC-based inline secure communication service may support inter-network function and intra-network function communications. The SmartNIC-based inline secure communication service may be inline between a network port (e.g., physical port of the SmartNIC) and a network function, a virtualized device, an application, or other node that provides a service or function.

In view of the foregoing, the SmartNIC-based inline secure communication service may centralize a service, such as encryption and decryption, relative to virtualized devices, such as network functions and may eliminate configuration disparities of such a service among network functions. Additionally, the SmartNIC-based inline secure communication service may offload resource utilization from the host hardware (e.g., processor, memory, storage, etc.) of the network functions to the SmartNIC that would otherwise occur to provide the service to the SmartNIC, as described herein. In this way, potential congestion or denial of service from the network functions may be minimized, for example.

Figure 1:
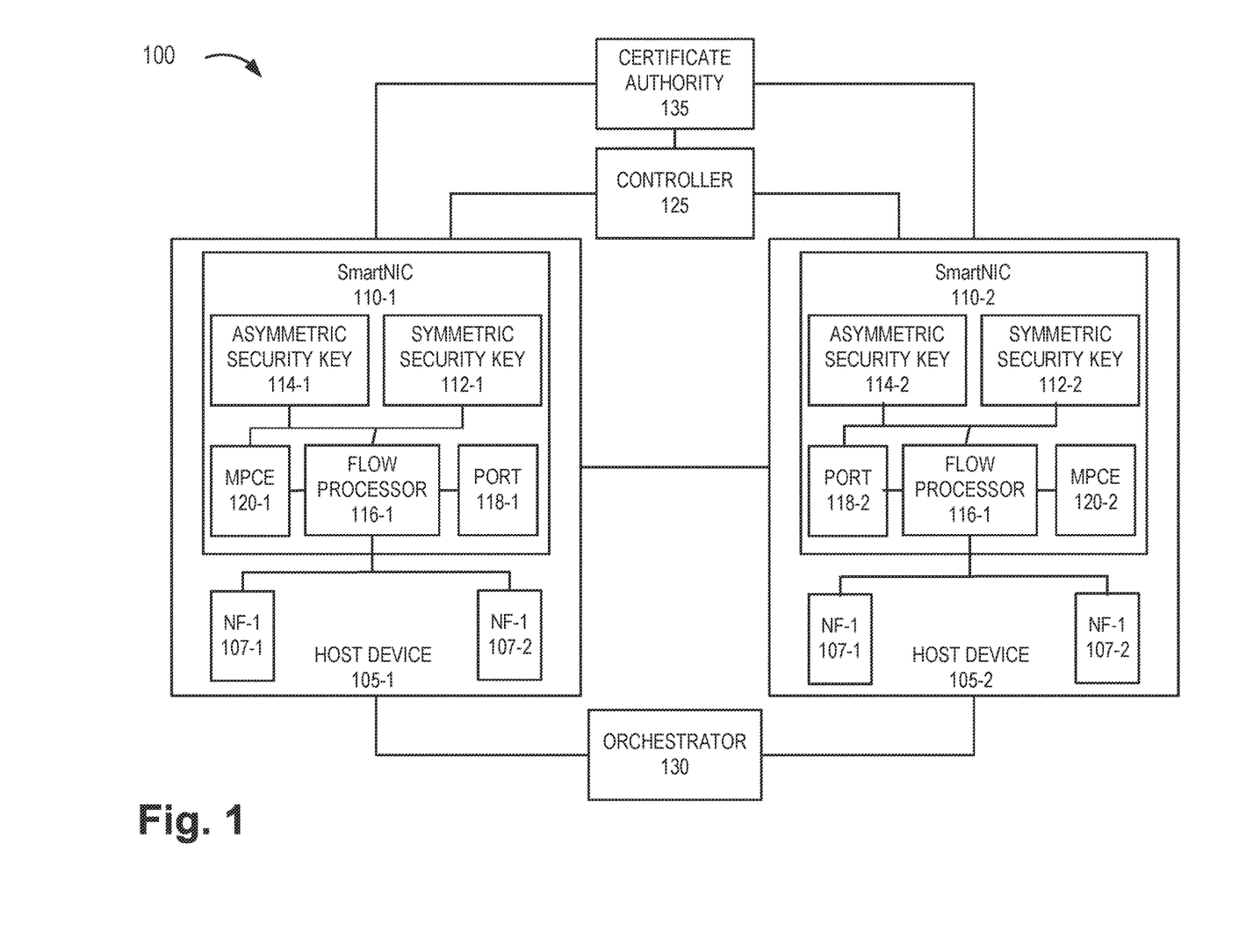
FIG. 1 is a diagram illustrating an exemplary environment in which an exemplary embodiment of a Smart Network Interface Card (SmartNIC)-based inline secure communication service may be implemented.

FIG. 1 is a diagram illustrating an exemplary environment 100 in which an exemplary embodiment of the SmartNIC-based inline secure communication service may be implemented. As illustrated, environment 100 includes host devices 105-1 and 105-2 (also referred to as host devices 105, and individually or generally as host device 105). Host device 105 includes network functions 107-1 and 107-2 (also referred to as network functions 107, and individually or generally as network function 107). Additionally, host device 105-1 includes a SmartNIC 110-1 and host device 105-2 includes a SmartNIC 110-2 (also referred to as SmartNICs 110, and individually or generally as SmartNIC 110). SmartNIC 110 may include a symmetric security key 112, an asymmetric security key 114, a flow processor 116, a physical port 118, and a multi-protocol cipher engine (MPCE) 120. As further illustrated, environment 100 may include a controller 125, an orchestrator 130, and a certificate authority device 135.

The number, the type, and the arrangement of devices are exemplary. For example, according to other embodiments, host device 105 may not include network functions 107. Additionally, or alternatively, environment 100 may include additional, different, and/or fewer devices.

A device may be implemented according to one or multiple architectures, such as a client device, a server device, a peer device, and/or a proxy device, for example. Additionally, a device may be implemented according to various computing architectures, such as centralized, distributed, cloud (e.g., elastic, public, private, etc.), edge, fog, and/or another type of computing architecture, and may be incorporated into various types of network architectures (e.g., software defined network (SDN), virtual network, logical network, network slice, etc.).

Environment 100 includes communication links between the devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication.

According to various exemplary embodiments, the devices of environment 100 may be implemented in various networks, such as a radio access network (RAN), a core network, an application layer network (e.g., a multi-access edge computing (MEC) network (also known as a mobile edge computing)), a fog network, the Internet, a service provider network, the World Wide Web (WWW), an Internet Protocol Multimedia Subsystem (IMS) network, a Rich Communication Service (RCS) network, or other type of network that may provide access to an end device application, service, or asset (also referred to as an "application service"), a local area network (LAN), a wide area network (WAN), a data center network, a self-organizing network (SON), an SDN, a virtual network, or other suitable network as described herein.

According to various exemplary embodiments, host device 105 may be implemented as a network device or an end device. For example, the network device may be a server device that provides an application service or a microservice. According to other examples, the network device may relate to various types of network devices that may reside in a RAN, a core network, a transport network, other types of networks, as described herein. For example, the network devices may include a RAN device, such as an evolved Node B (eNB), an evolved Long Term Evolution (eLTE) eNB, a next generation Node B (gNB), a centralized unit (CU), a distributed unit (DU), for example; a core device, such as a user plane function (UPF), a Non-3GPP Interworking Function (N3IWF), an access and management mobility function (AMF), a session management function (SMF), a unified data management (UDM) device, a unified data repository (UDR) device, an authentication server function (AUSF), a network slice selection function (NSSF), a network repository function (NRF), a policy control function (PCF), a binding support function (BSF), a network data analytics function (NWDAF), a network exposure function (NEF), a lifecycle management (LCM) device, an application function (AF), a mobility management entity (MME), a packet gateway (PGW), for example; or transport devices, such as routers, switches, repeaters, extenders, for example, or other types of network devices that may include the SmartNIC, as described herein. Additionally, for example, the end device may be a mobile device, a portable device, a stationary device (e.g., a non-mobile device), a device operated by a user, or a device not operated by a user. For example, the end device may be implemented as a smartphone, a mobile phone, a personal digital assistant, a tablet, a netbook, a phablet, a wearable device (e.g., a watch, glasses, etc.), a computer, customer premise equipment (CPE), a gaming device, a music device, an IoT device, a drone, a smart device, an autonomous device, or other type of device.

According to an exemplary embodiment, host device 105 includes one or multiple network functions 107. According to various exemplary embodiments, network function 107 may implemented according to a virtualization technology, such as container-based, hypervisor-based (e.g., bare-metal hypervisor, hosted hypervisor) (also known as a virtual machine), or other known (e.g., proprietary, hybrid, etc.) network function virtualization (NFV), or future generation virtualization. Depending on the type of host device 105, network function 107 may correspondingly provide an application, a microservice, a service, or other function.

Symmetric security key 112 may include a symmetric key (e.g., a secret key) associated with a symmetric-key algorithm used to encrypt and decrypt data. Asymmetric security key 114 may include an asymmetric key (e.g., public key, private key) associated with an asymmetric algorithm used to encrypt and decrypt data.

Flow processor 116 may include a processor that may perform various services in support of the SmartNIC-based inline secure service, as described. For example, flow processor 116 may provide communication-related services, such as packet processing and collaborative services with MPCE 120, as described herein. Flow processor 116 may be configured to perform various processing operations that support other programmable services.

Physical port 118 may include a network port via which inbound and outbound traffic may be transmitted and received. For example, physical port 118 may include an optical port, a wired port, a wireless port, copper interface, or a small form factor pluggable.

MPCE 120 may include logic that provides encryption and decryption services for inbound and outbound traffic, as described herein. For example, MPCE 120 may include asymmetric and/or symmetric algorithms that encrypt and decrypt packets and/or data. MPCE 120 may also include policies, rules, and/or configuration data that may relate to the selection of an algorithm and a security key to use, for example. MPCE 120 may be configured to access, update, and use asymmetric key 114 and symmetric key 112, as described herein. MPCE 120 may perform calculations at configurable line rate speeds to minimize latency resulting from packet processing, as described herein.

As previously mentioned, environment 100 may include network devices, such as controller 125, orchestrator 130, and certificate authority device 135. Controller 125 may be implemented as an SDN controller that may manage flow control to switches and routers (e.g., via southbound application programming interfaces (APIs), and application and business logic (e.g., via northbound APIs). Controller 125 may perform other tasks to manage an SDN network. According to other exemplary embodiments, controller 125 may be a non-SDN controller, such as a control console for a firewall (or other type of security device), a management platform for a certificate authority device, or some other network device that may facilitate retrieval of a digital certificate by SmartNIC 110 on behalf of network function 107.

Orchestrator 130 may include a network device that provides service or application orchestration, such as a network function virtualization orchestrator (NFVO). For example, orchestrator 130 may instantiate and terminate network services and virtual network functions, scaling in and out of network services and virtual network functions, updating, monitoring, and onboarding of network services and virtual network functions, as well as other types of functions. Although not illustrated, environment 100 may include other types of network devices that may support virtualization, such as a virtual network function manager (VNFM), a virtualized infrastructure manager (VIM), a platform manager, or other network devices of a network function virtualization infrastructure (NFVI).

Certificate authority device 135 may include a network device that may validate an identity and bind the identity to a cryptographic key through the issuance of a digital certificate.

Figure 2:
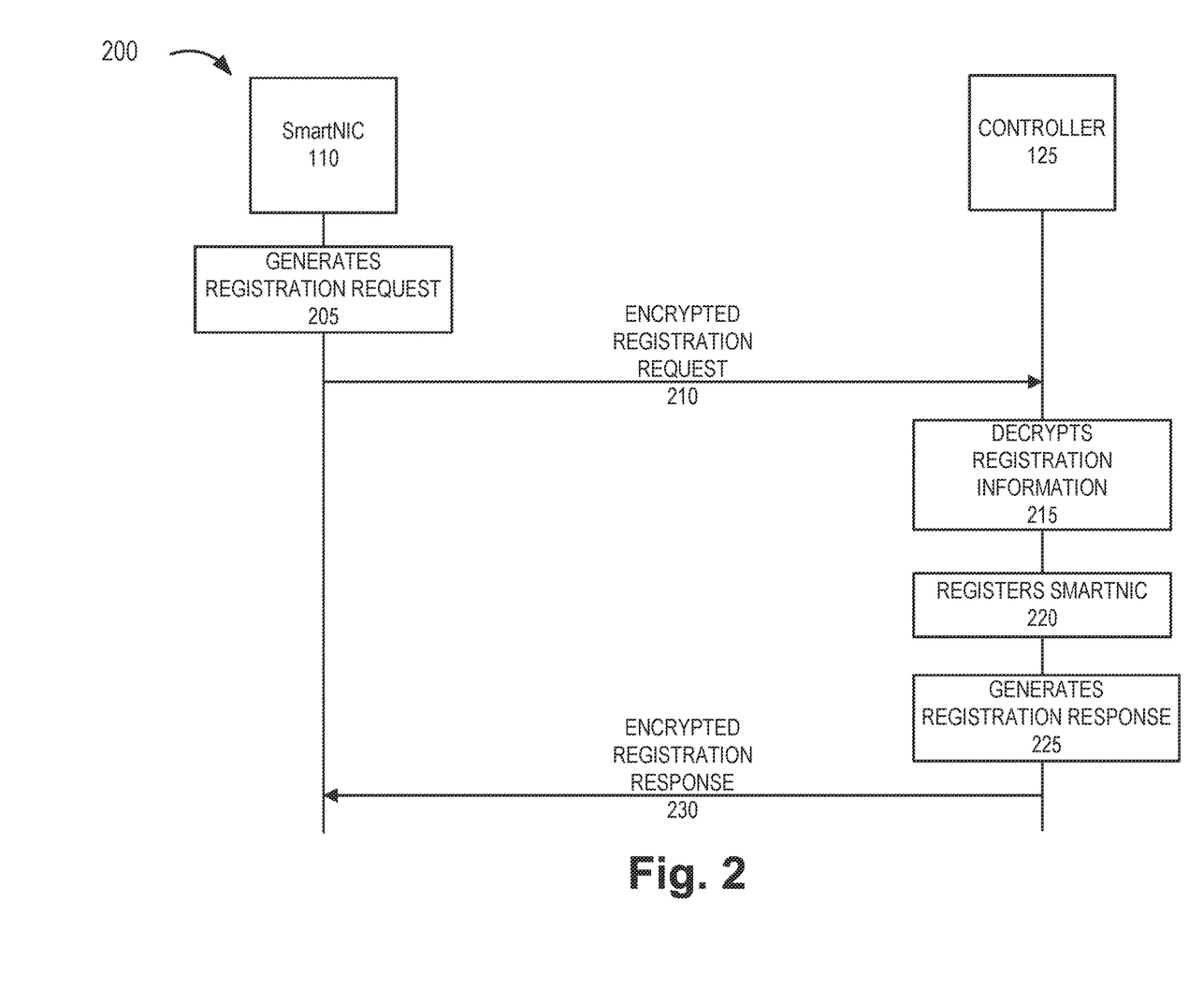
FIG. 2 is a diagram illustrating an exemplary process of an exemplary embodiment of the SmartNIC-based inline secure communication service.

FIG. 2 is a diagram illustrating an exemplary process 200 of an exemplary embodiment of the SmartNIC-based inline secure communication service. As illustrated, according to an exemplary scenario, assume that SmartNIC 110 is installed in or re-initialized in host device 105. SmartNIC 110 may generate a registration request 205. The registration request may include registration data pertaining to SmartNIC 110, such as a capability information of SmartNIC 110 (e.g., processor, memory, network port, interface speed, firmware version, etc.), and Media Access Control (MAC) address, for example. SmartNIC 110 may encrypt the registration request and transmit an encrypted registration request 210 to controller 125. For example, SmartNIC 110 may use a symmetric key of symmetric security key 112. Alternatively, SmartNIC 110 may use an asymmetric key of asymmetric security key store 114, or perhaps not use encryption at all.

In response to receiving the encrypted registration request 210, controller 125 may decrypt the registration information 215 and may register the registration information of SmartNIC 220. For example, controller 125 may store the registration information in a database or a suitable data structure (e.g., table, list, etc.). Controller 125 may associate SmartNIC 110 with host device 105. Controller 125 may use the registration information for flow control, inventorying devices, monitoring, and other configurable tasks. Controller 125 may generate a registration response 225 and transmit an encrypted registration response 230 to SmartNIC 110. The encrypted registration response 230 may indicate that SmartNIC 110 has been registered and associated with host device 105.

Although FIG. 2 illustrates an exemplary embodiment of a process of the SmartNIC-based inline secure communication service, according to other exemplary scenarios, the SmartNIC-based inline secure communication service may perform additional operations, fewer operations, and/or different operations than those illustrated and described. For example, a discovery procedure may be performed by SmartNIC 110 and/or controller 125 to discover each other. Various discovery procedures may be implemented, such as methods associated with Universal Plug-N-Play (UPnP), network mapping, use of common Internet Protocol multicast addresses, and/or other well-known discovery mechanisms.

Figure 3:
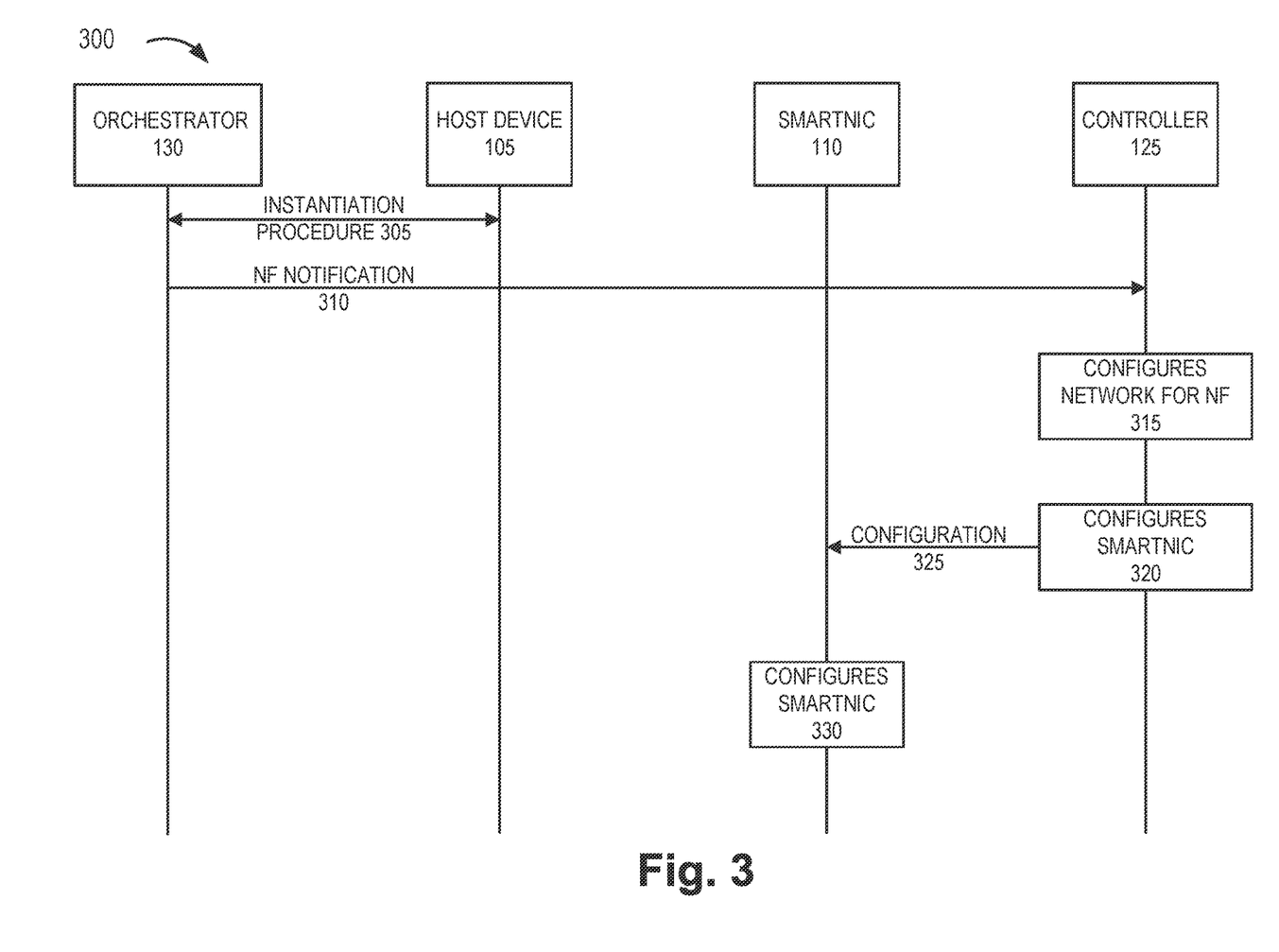
FIG. 3 is a diagram illustrating another exemplary process of an exemplary embodiment of the SmartNIC-based inline secure communication service.

FIG. 3 is a diagram illustrating an exemplary process 300 of another exemplary embodiment of the SmartNIC-based inline secure communication service. As illustrated, according to an exemplary scenario, orchestrator 130 determines to instantiate a new network function 107 on host device 105, or according to another exemplary scenario, migrate network function 107 from one host device 105 to another host device 105. As illustrated, orchestrator 130 and host device 105 may perform an instantiation procedure 305. Although not illustrated, orchestrator 130 may also communicate to other virtualization elements (e.g., a VNFM, a VIM, etc.). As part of the instantiation procedure, orchestrator 130 may specify requirements for the new network function 107, which may include indicating that the new network function 107 will use encryption/decryption for communications (e.g., inbound and/or outbound traffic). Host device 105 may provide orchestrator 130 various information relating to the new network function 107, which may include an identifier or name of network function 107, a MAC address of network function 107, and any other information that may be need for network connectivity.

Based on this information, orchestrator 130 may provide a network function notification 310 to controller 125. The notification may include information relating to host device 105 and new network function 107. For example, the information may include the name or identifier of host device 105 and/or network function 107, information relating to an IP address associated with network function 107, and information relating to network connectivity with other host devices 105 and/or other network devices. For example, network connectivity information may include a virtual local area network (VLAN) or virtual extensible LAN (VXLAN) identifier, an address and/or identifier of a virtual interface of SmartNIC 110 and new network function 107, and/or other network interface information that supports connectivity between host device 105/network function 107 via SmartNIC 110 with external network devices, networks, and so forth.

Based on the NF notification, controller 125 (e.g., SDN controller) may configure network connectivity 315 for new network function 107. For example, controller 125 may configure a router or other switching fabric (not illustrated) that supports layer 2 and/or layer 3 connectivity with network function 107 for inbound/outbound traffic. The network connectivity configuration may also include information relating to a network (e.g., a VLAN, VXLAN, etc.), and/or other network address and/or port information. Controller 125 may also configure network connectivity 320 with SmartNIC 110. For example, configuration 325 may include VLAN, VXLAN, or other type of network information, network address information pertaining to a router/switch, and/or other types of network connectivity information. The network connectivity information may be configured on SmartNIC 110. Configuration 325 may include other types of information, such as an access control list (ACL), policies, next hop, flow rules related to inbound/outbound traffic, and/or other types of network, routing, and/or traffic management-related configurations. According to various embodiments, flow processor 116 and MPCE 120 may be configured based on configuration 325. For example, flow processor 116 may be configured to forward all inbound and outbound traffic of network function 107 to MPCE 120. As illustrated, based on receiving configuration 325, SmartNIC 110 may configure itself 330. Configuration 325 may include configurations related to the SmartNIC-based inline secure communication for new network function 107, such as policies/rules relating to encryption/decryption, such as type (e.g., symmetric or asymmetric), key(s) (e.g., secret, public, private), inbound versus outbound traffic, and/or other security-related and/or packet processing services.

Although FIG. 3 illustrates an exemplary embodiment of a process of the SmartNIC-based inline secure communication service, according to other exemplary scenarios, the SmartNIC-based inline secure communication service may perform additional operations, fewer operations, and/or different operations than those illustrated and described.

Figure 4A:
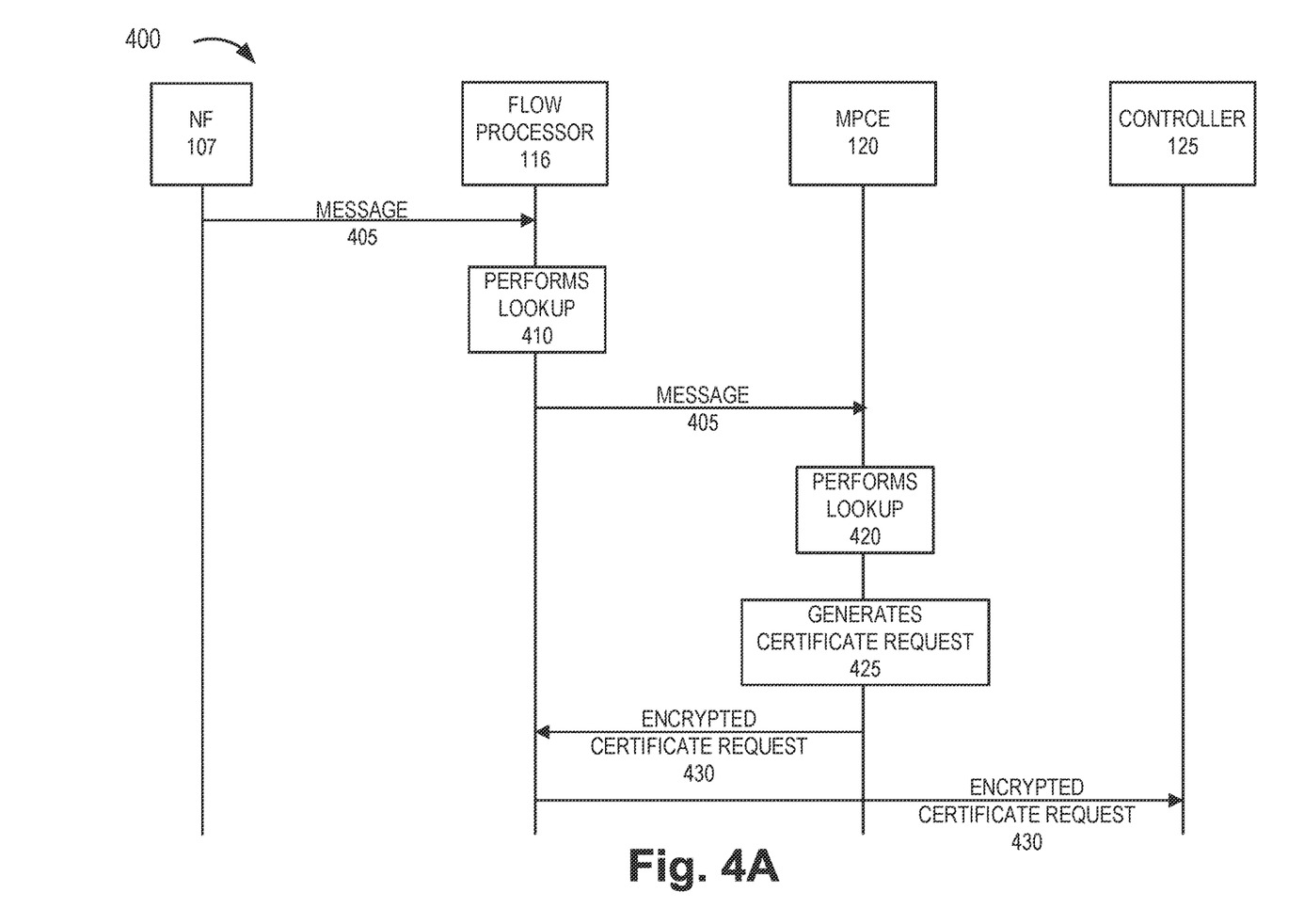
FIGS. 4A and 4B are diagrams illustrating yet another exemplary process of an exemplary embodiment of the SmartNIC-based inline secure communication service.
Figure 4B:
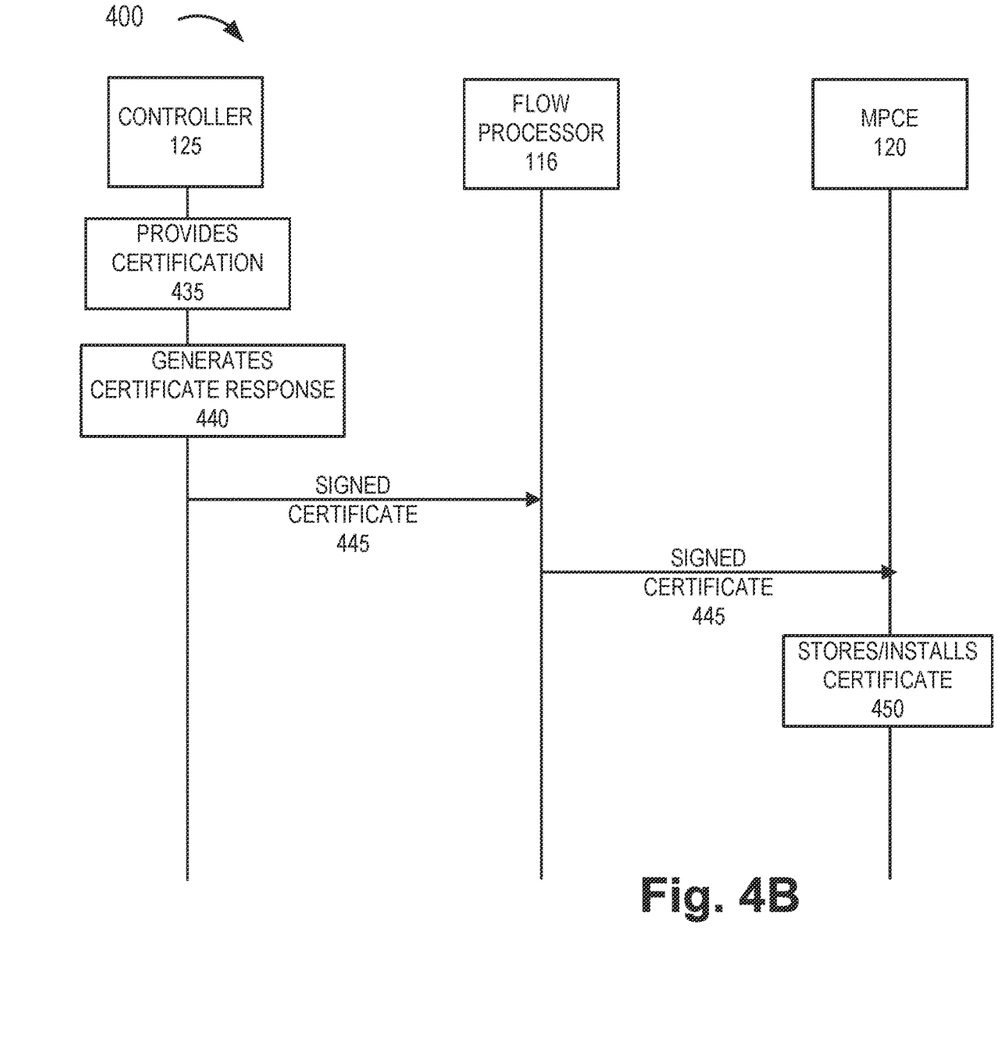

FIGS. 4A and 4B are diagrams illustrating yet another exemplary process of an exemplary embodiment of the SmartNIC-based inline secure communication service. According to an exemplary scenario, after instantiation network function 107 may attempt to communicate with a device external from host device 105. For example, network function 107 may attempt to communicate with a VIM, another network function 107 of another host device 105, or some other network device in a network.

Referring to FIG. 4A, network function 107 may generate and transmit a message 405, which may be received by flow processor 116. Flow processor 116 may perform a lookup 410 to determine how to handle the message. For example, flow processor 116 may be configured with rules, policies, and/or other configuration information relating to network functions 107 and the services provided by SmartNIC 110. According to this example, assume a rule indicates that outbound messages from network function 107 are to be encrypted. Flow processor 116 transmits the message 405 to MPCE 120. In response to receiving message 405, MPCE 120 may perform a lookup 420 to identify the configuration for encryption on behalf of network function 107.

According to this exemplary scenario, assume there is no key stored for network function 107 to enable encryption of message 405. Based on this determination, MPCE 120 may generate a certificate signing request (CSR) 425 based on information provided by orchestrator 130 and the instantiation procedure for network function 107. MPCE 120 may encrypt the certificate request with an encryption key, for example, and transmit the encrypted certificate request 430 to controller 125 via flow processor 116 and physical port 118.

Referring to FIG. 4B, according to this exemplary scenario, controller 125 may include an intermediary certificate authority (ICA), which provides certificate services 435. For example, the ICA may generate a certificate. According to another exemplary scenario, controller 125 may transmit the encrypted certificate request 430 to certificate authority 135 (not illustrated). According still another exemplary scenario, MPCE 120 may transmit the encrypted certificate request to certificate authority 135 without controller 125 involvement. However, for purposes of chain of trust, certificate authority 135 and SmartNIC 110 may need to establish or have established authentication and encryption measures.

Controller 125 may generate a certificate response 440 that includes the certificate. Controller 125 may transmit a signed certificate 445 to MPCE 120 via flow processor 116 of SmartNIC 110. MPCE 120 may store or install the received certificate 450. MPCE 120 may use the network function's 107 signed certificate when setting up network connections on behalf of network function 107.

Although FIGS. 4A and 4B illustrate an exemplary embodiment of a process of the SmartNIC-based inline secure communication service, according to other exemplary scenarios, the SmartNIC-based inline secure communication service may perform additional operations, fewer operations, and/or different operations than those illustrated and described.

Figure 5A:
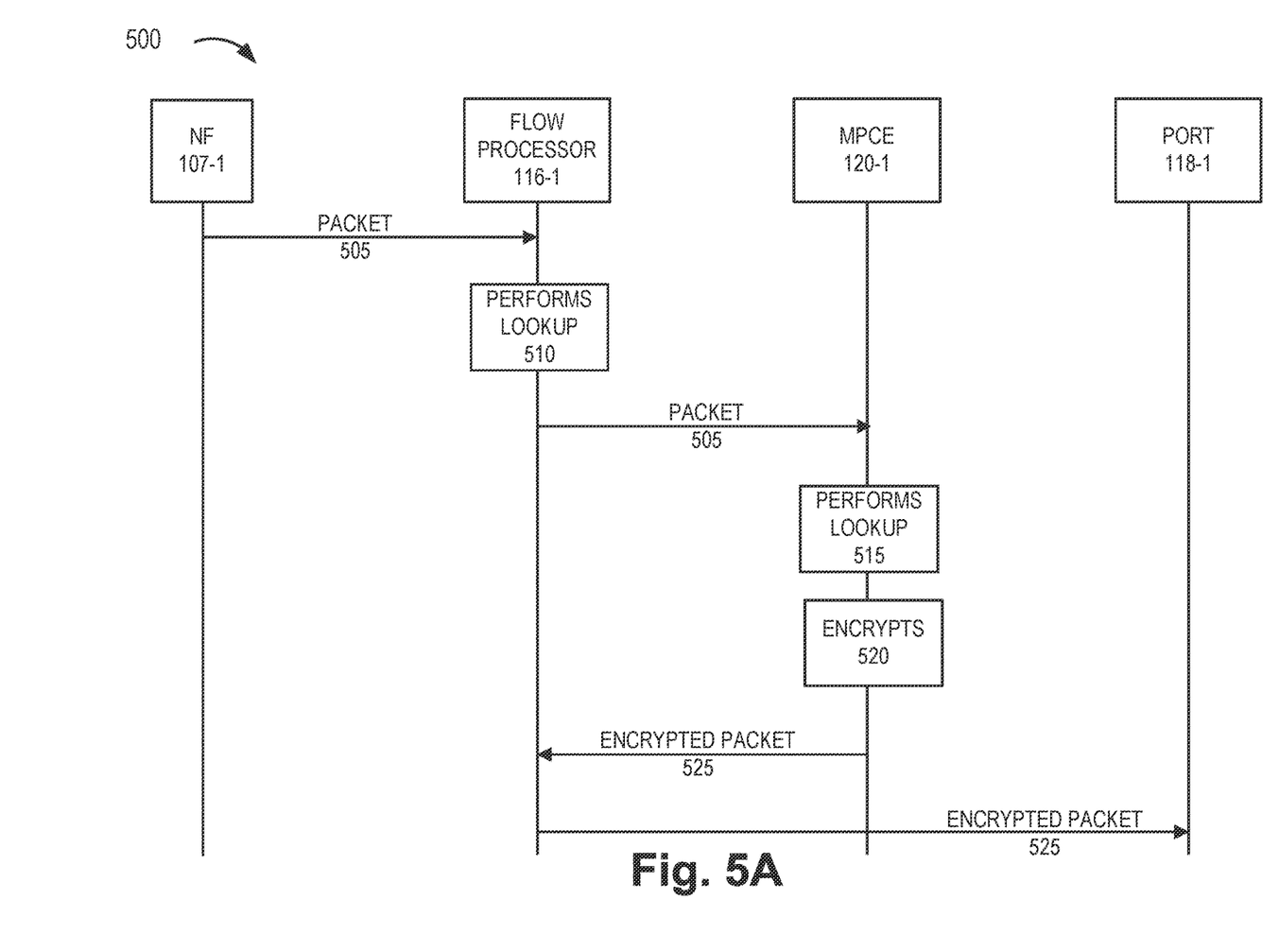
FIGS. 5A and 5B are diagrams illustrating still another exemplary process of an exemplary embodiment of the SmartNIC-based inline secure communication service.
Figure 5B:
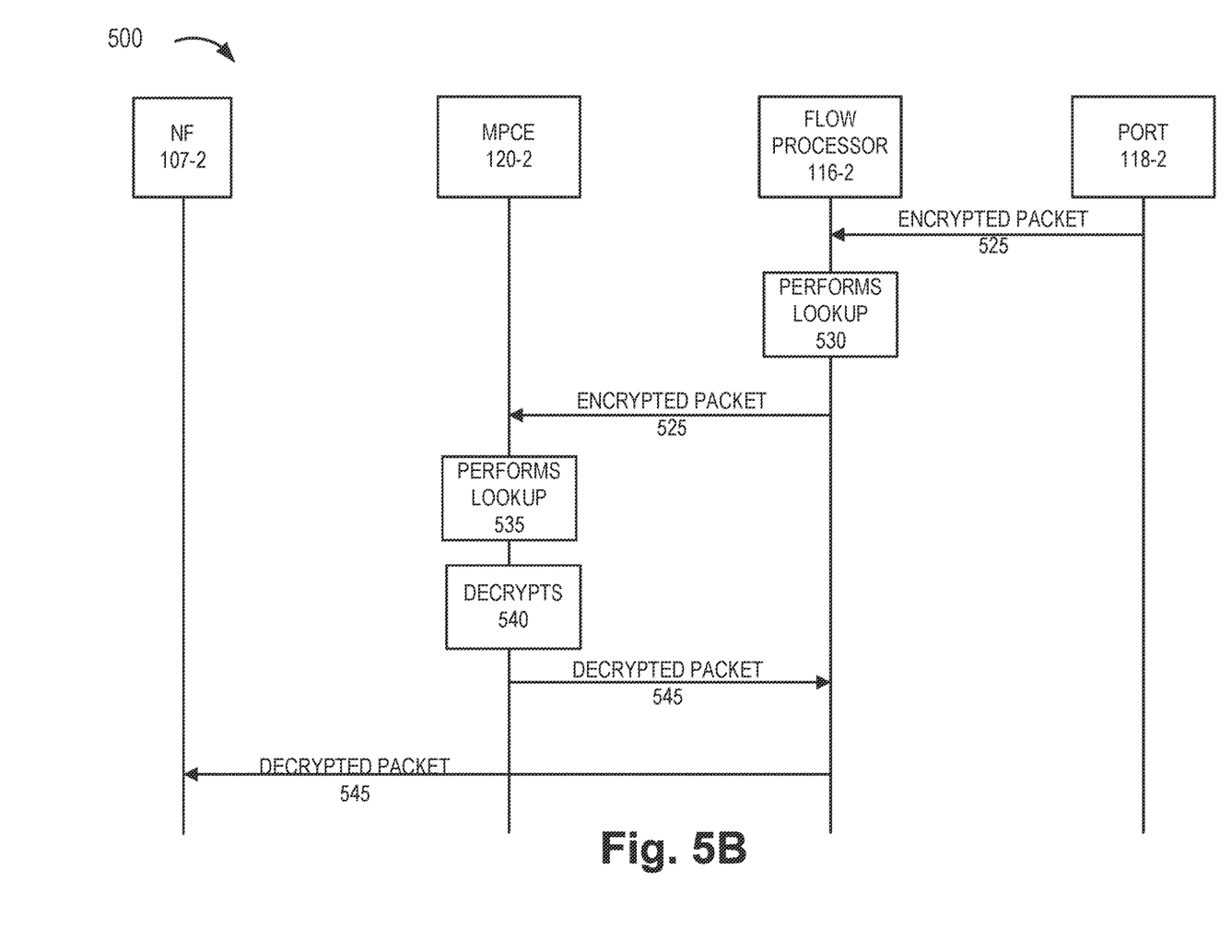

FIGS. 5A and 5B are diagrams illustrating still another exemplary process of an exemplary embodiment of the SmartNIC-based inline secure communication service. According to an exemplary scenario, assume network function 107-1 of host device 105-1 wants to communicate with network function 107-2 of host device 105-2. Referring to FIG. 5A, network function 107-1 may generate a packet and transmit the packet 505 to flow processor 116-1. In response to receiving the packet 505, flow processor 116-1 may perform a lookup 510 to determine how to handle the packet 505. Depending on the configuration for outbound traffic of network function 107-1, a rule, a policy, or other configuration may indicate that the packet 505 is to be encrypted or not. When the outbound traffic is to be encrypted, flow processor 116-1 may forward the packet 505 to MPCE 120-1. However, when the outbound traffic is not to be encrypted, flow processor 116-1 may forward the packet 505 to physical port 118-1 for transmission to its destination.

According to this exemplary scenario, assume that outbound packets of network function 107-1 are to be encrypted. As illustrated, flow processor 116-1 may transmit the packet 505 to MPCE 120-1. In response to receiving the packet 505, MPCE 120-1 may perform a lookup 515 to determine the particulars for encryption (e.g., key, etc.) for outbound traffic of network function 107-1. MPCE 120-1 may encrypt 520 the payload of packet 505 based on the configuration settings. For example, MPCE 120-1 may use a symmetric security key 112-1 or an asymmetric security key 114-1. MPCE 120-1 may transmit the encrypted packet 525 to flow processor 116-1. According to some exemplary embodiments, flow processor 116-1 may perform additional packet processing related to quality of service (QoS), Dynamic Host Configuration Protocol (DHCP), Class of Service (CoS), and/or other flow rule procedures. Flow processor 116-1 may transmit the encrypted packet 525 to physical port 118-1, which is subsequently transmitted towards its destination.

Referring to FIG. 5B, physical port 118-2 of host device 105-2 may receive the encrypted packet 525. In response to receiving the packet 505, flow processor 116-2 may perform a lookup 530 to determine how to handle the encrypted packet 525. Depending on the configuration for inbound traffic of network function 107-2, a rule, a policy, or other configuration may indicate how to manage packets. For example, when inbound traffic is encrypted, flow processor 116-2 may forward the packets to MPCE 120-2. However, when inbound traffic is not encrypted, flow processor 116-2 may forward the packets to network function 107 via its virtual function (VF) port.

According to this exemplary scenario, as illustrated, flow processor 116-2 may transmit the encrypted packet 525 to MPCE 120-2 for decryption. In response to receiving the encrypted packet 525, MPCE 120-2 may perform a lookup 535 to determine the particulars for decryption (e.g., key, etc.) for inbound traffic to network function 107-2. MPCE 120-2 may decrypt 540 the payload of packet 525 based on the configuration settings. For example, MPCE 120-1 may use a symmetric security key 112-2 or an asymmetric security key 114-2. MPCE 120-2 may transmit the decrypted packet 545 to flow processor 116-2. Flow processor 116-2 may transmit the decrypted packet 525 to network function 107-2 via its VF port.

Although FIGS. 5A and 5B illustrate an exemplary embodiment of a process of the SmartNIC-based inline secure communication service, according to other exemplary scenarios, the SmartNIC-based inline secure communication service may perform additional operations, fewer operations, and/or different operations than those illustrated and described.

Figure 6:
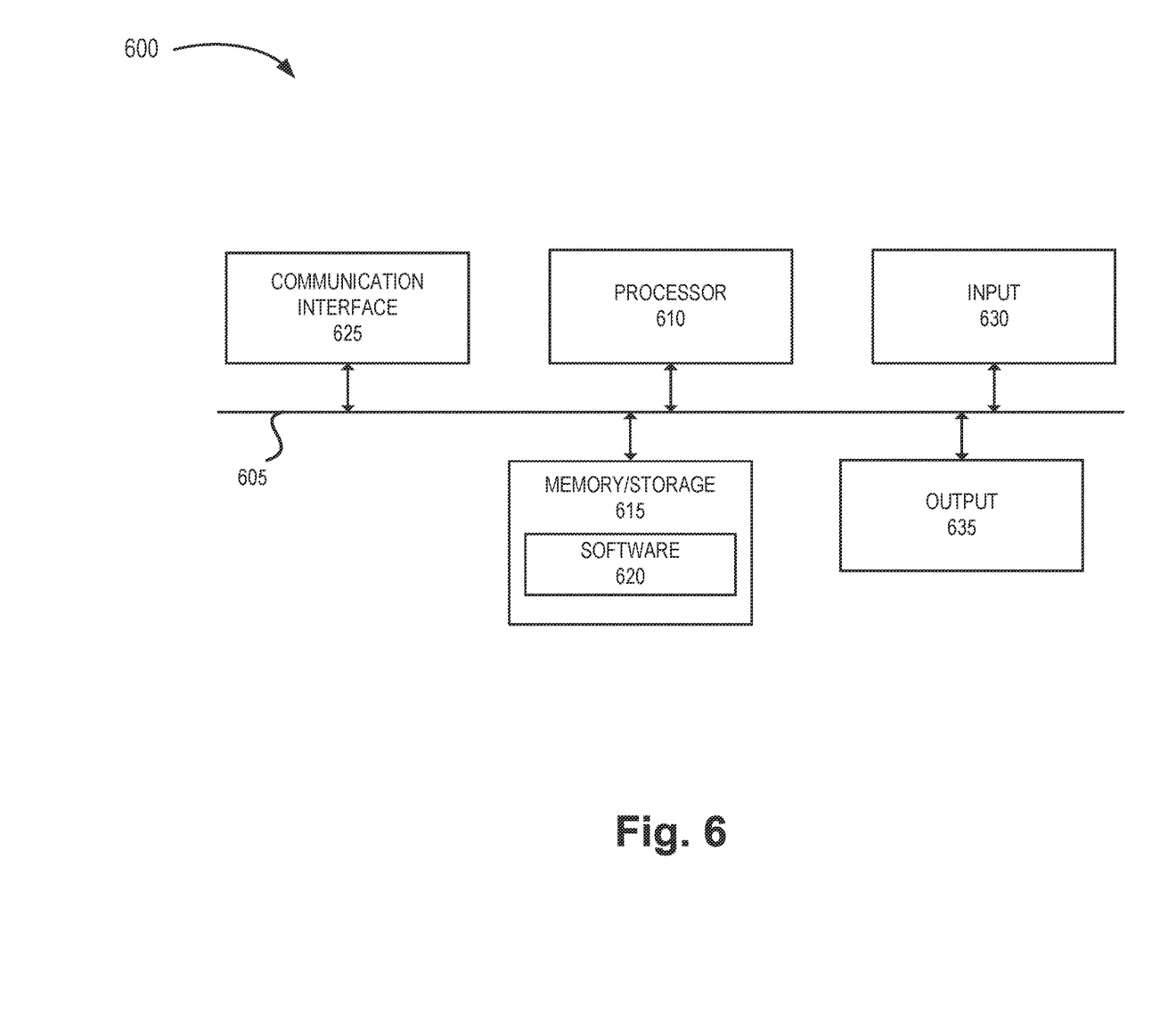
FIG. 6 is a diagram illustrating exemplary components of a device that may correspond to one or more of the devices illustrated and described herein.

FIG. 6 is a diagram illustrating exemplary components of a device 600 that may be included in one or more of the devices described herein. For example, device 600 may correspond to SmartNIC 110, host device 105, controller 125, orchestrator 130, certificate authority 135, and/or other types of devices, as described herein. As illustrated in FIG. 6, device 600 includes a bus 605, a processor 610, a memory/storage 615 that stores software 620, a communication interface 625, an input 630, and an output 635. According to other embodiments, device 600 may include fewer components, additional components, different components, and/or a different arrangement of components than those illustrated in FIG. 6 and described herein. For example, host device 105 may include SmartNIC 110 instead of communication interface 625.

Bus 605 includes a path that permits communication among the components of device 600. For example, bus 605 may include a system bus, an address bus, a data bus, and/or a control bus. Bus 605 may also include bus drivers, bus arbiters, bus interfaces, clocks, and so forth.

Processor 610 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 610 may be implemented as hardware (e.g., a microprocessor, etc.), a combination of hardware and software (e.g., a SoC, an ASIC, etc.), may include one or multiple memories (e.g., cache, etc.), etc. For SmartNIC 110, processor 610 may be implemented as flow processor 116, as described herein. Additionally, for example, SmartNIC 110 may include other processors for packet processing tasks (e.g., encryption/decryption or other security-related procedures, non-security-related procedures, etc.).

Processor 610 may control the overall operation, or a portion of operation(s) performed by device 600. Processor 610 may perform one or multiple operations based on an operating system and/or various applications or computer programs (e.g., software 620). Processor 610 may access instructions from memory/storage 615, from other components of device 600, and/or from a source external to device 600 (e.g., a network, another device, etc.). Processor 610 may perform an operation and/or a process based on various techniques including, for example, multithreading, parallel processing, pipelining, interleaving, learning, model-based, etc.

Memory/storage 615 includes one or multiple memories and/or one or multiple other types of storage mediums. For example, memory/storage 615 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 615 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 615 may include drives for reading from and writing to the storage medium.

Memory/storage 615 may be external to and/or removable from device 600, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 615 may store data, software, and/or instructions related to the operation of device 600. For example, SmartNIC 110 may include memory/storage 615 that stores encryption/decryption algorithms, security keys, and/or other instructions that provide one or more of the functions and/or processes of the SmartNIC-based inline secure communication service, as described herein.

Software 620 includes an application or a program that provides a function and/or a process. As an example, with reference to SmartNIC 110, software 620 may include an application that, when executed by processor 610, provides a function and/or a process of the SmartNIC-based inline secure communication service, as described herein. For example, MPCE 120 may be implemented, in whole or in part, as software 620 executed by a processor (e.g., flow processor 116 or another processor included in MPCE 120). Additionally, or alternatively, flow processor 116 may include software 620 that when executed provides a function and/or a process of the SmartNIC-based inline secure communication service, as described herein.

Additionally, for example with reference to controller 125 and/or orchestrator 130, software 620 may include an application that, when executed by processor 610, provides a function and/or a process, as described herein. Software 620 may also include firmware, middleware, microcode, hardware description language (HDL), and/or other form of instruction. Software 620 may also be virtualized. Software 620 may further include an operating system (OS) (e.g., Windows, Linux, Android, proprietary, etc.).

Communication interface 625 permits device 600 to communicate with other devices, networks, systems, and/or the like. Communication interface 625 includes one or multiple wireless interfaces and/or wired interfaces. For example, communication interface 625 may include one or multiple transmitters and receivers, or transceivers. Communication interface 625 may operate according to a protocol stack and a communication standard. Communication interface 625 may include an antenna. Communication interface 625 may include various processing logic or circuitry (e.g., multiplexing/de-multiplexing, filtering, amplifying, converting, error correction, application programming interface (API), etc.). Communication interface 625 may be implemented as a point-to-point interface, a service-based interface, or a reference interface, for example.

Input 630 permits an input into device 600. For example, input 630 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 635 permits an output from device 600. For example, output 635 may include a speaker, a display, a touchscreen, a touchless screen, a light, an output port, and/or some other type of visual, auditory, tactile, etc., output component.

As previously described, a device may be implemented according to various computing architectures (e.g., in a cloud, etc.) and according to various network architectures (e.g., a virtualized function, etc.). Device 600 may be implemented in the same manner. For example, device 600 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in an application service layer network and/or another type of network (e.g., a RAN, a core network, etc.).

Device 600 may perform a process and/or a function, as described herein, in response to processor 610 executing software 620 stored by memory/storage 615. By way of example, instructions may be read into memory/storage 615 from another memory/storage 615 (not shown) or read from another device (not shown) via communication interface 625. The instructions stored by memory/storage 615 cause processor 610 to perform a function or a process described herein. Alternatively, for example, according to other implementations, device 600 performs a function or a process described herein based on the execution of hardware (processor 610, etc.).

Figure 7:
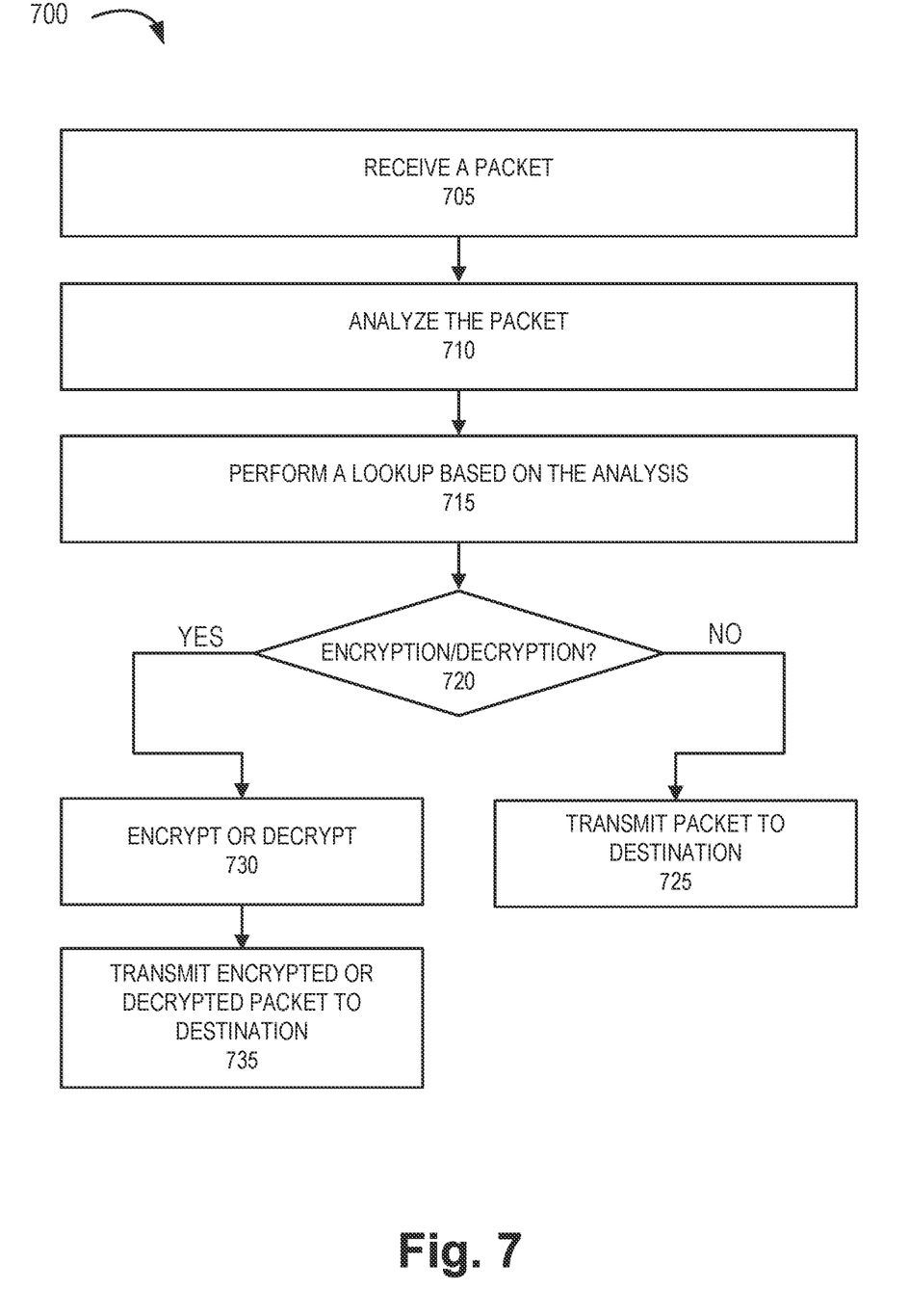
FIG. 7 is a flow diagram illustrating an exemplary process of an exemplary embodiment of the SmartNIC-based inline secure communication service.

FIG. 7 is a flow diagram illustrating an exemplary process 700 of an exemplary embodiment of the SmartNIC-based inline secure communication service. According to an exemplary embodiment, SmartNIC 110 may perform process 700. According to an exemplary implementation, processor 610 may execute software 620 to perform a step of process 700, as described herein. Alternatively, the step may be performed by execution of only hardware.

In block 705, SmartNIC 110 may receive a packet. For example, flow processor 116 may receive a packet via physical port 118, such as inbound traffic from a device external from host device 105. Alternatively, flow processor 116 may receive a packet via a VF port from network function 107, such as outbound traffic.

In block 710, flow processor 116 may analyze the packet. For example, flow processor 116 may determine one or multiple criteria relating to the packet, such as where the packet originated (e.g., network function 107 of host device 105, a network function 107 of another host device 105) and/or where the packet is destined (e.g., another network function 107 of host device 105, a destination external from host device 105). Flow processor 116 may perform a packet inspection (e.g., header information of the packet, payload information, etc.) to identify one or more of source IP address information, destination IP address information, source port number, destination port number, or application traffic (e.g., payload).

In block 715, flow processor 116 may perform a lookup based on the analysis. For example, flow processor 116 may identify a rule or a policy related to network function 107 to which the packet is destined and/or from which the packet originated. The policy or rule may be correlated to an IP address or an identifier of network function 107. For example, the policy or the rule may indicate whether the packet is to be encrypted or decrypted. By way of further example, network function 107 of host device 105 may include rules or policies pertaining to encryption and decryption in relation to inbound traffic and outbound traffic. Additionally, there may be policies or rules relating to intra-network function communication (e.g., communication between network functions 107 of the same host device 105) or inter-network function communication (e.g., communication between network functions 107 of different host devices 105) and encryption and decryption.

Based on a result of the lookup, in block 720, flow processor 116 may determine whether encryption or decryption is to be performed or no encryption or decryption is to be performed in relation to the packet. When flow processor 116 determines that no encryption or decryption is to be performed (block 720-NO), flow processor 116 may forward the packet to its destination (block 725). For example, depending on various exemplary scenarios, when the destination is external from host device 105, flow processor 116 may forward the packet towards its destination via physical port 118, and when the destination is internal to host device 105, flow processor 116 may forward the packet to a network function 107 of host device 105.

When flow processor 116 determines that encryption or decryption is to be performed (block 720-YES), flow processor 116 may forward the packet to MPCE 120 for encryption or decryption (block 730). MPCE 120 may perform a lookup, as previously described. For example, MPCE 120 may select the policy or the rule related to encryption or decryption, such as selection of encryption/decryption algorithm, selection of a security key, and so forth. MPCE 120 may perform encryption or decryption of the packet using an asymmetric key 114 or a symmetric key 112 of SmartNIC 110.

In block 735, MPCE 120 may transmit the encrypted packet or the decrypted packet to its destination. For example, MPCE 120 may transmit the encrypted packet or the decrypted packet to flow processor 116. Flow processor 116 may, in turn, transmit the encrypted packet or the decrypted packet to a network function 107 of host device 105, or to a destination external from host device 105 via physical port 118.

Although FIG. 7 illustrates an exemplary embodiment of a process of the SmartNIC-based inline secure communication service, according to other exemplary scenarios, the SmartNIC-based inline secure communication service may perform additional operations, fewer operations, and/or different operations than those illustrated and described. For example, according to other exemplary embodiments, host device 105 may not be a virtualized device that includes network functions 107. As an example, host device 105 may be a non-virtualized device that includes one or multiple applications. SmartNIC 110 may provide the SmartNIC-based inline secure communication service in relation to the one or multiple applications.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described regarding the process illustrated in FIG. 7, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 610, etc.), or a combination of hardware and software (e.g., software 620).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 610) of a device. A non-transitory storage medium includes one or more of the storage mediums described in relation to memory/storage 615. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
   receiving, by a Smart Network Interface Card (SmartNIC) of a device, a packet;
   analyzing, by the SmartNIC, the packet;
   determining, by the SmartNIC based on the analysis, whether the packet is subject to security or not, wherein the security includes encryption or decryption of the packet;
   encrypting or decrypting, by the SmartNIC based on determining that the packet is subject to the security, the packet;
   performing, by the SmartNIC after the encrypting or the decrypting, a class of service flow procedure on the encrypted packet or the decrypted packet; and
   forwarding, by the SmartNIC, the encrypted packet or the decrypted packet towards its destination.

2. The method of claim 1, wherein a source of the packet or the destination of the packet includes a virtual network function of the device, and wherein the device is a host device of one or multiple virtual network functions.

3. The method of claim 2, further comprising:
   receiving, by the SmartNIC, configuration information pertaining to encryption and decryption of traffic to and from the virtual network function; and
   storing, by the SmartNIC, the configuration information.

4. The method of claim 3, wherein the determining comprises:
   performing, by the SmartNIC, a lookup of the configuration information based on a source address of the packet or a destination address of the packet.

5. The method of claim 2, further comprising:
   generating, by the SmartNIC, a certificate signing request;
   transmitting, by the SmartNIC, the certificate signing request to a certificate authority device;
   receiving, by the SmartNIC and responsive to the certificate signing request, a signed certificate; and
   establishing, by the SmartNIC, network connections to devices external from the device and on behalf of the virtual network function based on the signed certificate.

6. The method of claim 2, further comprising:
receiving, by the SmartNIC, network connectivity configuration information pertaining to the virtual network function; and
storing, by the SmartNIC, the network connectivity configuration information.

7. The method of claim 1, further comprising:
performing, by the SmartNIC, a non-repudiation service relative to the packet.

8. The method of claim 1, further comprising:
storing, by the SmartNIC, one or more security keys and one or more security algorithms, and wherein the encrypting or decrypting comprises:
encrypting or decrypting, by the SmartNIC, the packet based on one of the one or more security keys and one of the one or more security algorithms.

9. A Smart Network Interface Card (SmartNIC) comprising:
a processor configured to:
receive a packet;
analyze the packet;
determine, based on the analysis, whether the packet is subject to security or not, wherein the security includes encryption or decryption of the packet;
encrypt or decrypt the packet based on a determination that the packet is subject to the security;
perform, after the encrypting or the decrypting, a class of service flow procedure on the encrypted packet or the decrypted packet; and
forward the encrypted packet or the decrypted packet towards its destination.

10. The SmartNIC of claim 9, wherein a source of the packet or the destination of the packet includes a virtual network function of a device of the SmartNIC, and wherein the device is a host device of one or multiple virtual network functions.

11. The SmartNIC of claim 10, wherein the processor is further configured to: receive configuration information pertaining to encryption and decryption of traffic to and from the virtual network function; and
store the configuration information.

12. The SmartNIC of claim 11, wherein when determining, the processor is further configured to:
perform a lookup of the configuration information based on a source address of the packet or a destination address of the packet.

13. The SmartNIC of claim 10, wherein the processor is further configured to:
generate a certificate signing request;
transmit the certificate signing request to a certificate authority device;
receive a signed certificate, which is responsive to the certificate signing request; and
establish network connections to devices external from the device and on behalf of the virtual network function based on the signed certificate.

14. The SmartNIC of claim 10, wherein the processor is further configured to:
receive network connectivity configuration information pertaining to the virtual network function; and
store the network connectivity configuration information.

15. The SmartNIC of claim 9, wherein the processor is further configured to:
perform a non-repudiation service relative to the packet.

16. The SmartNIC of claim 9, wherein the processor is further configured to:
store one or more security keys and one or more security algorithms, and wherein when encrypting or decrypting, the processor is further configured to:
encrypt or decrypt the packet based on one of the one or more security keys and one of the one or more security algorithms.

17. A non-transitory computer-readable storage medium storing instructions executable by a processor of a Smart Network Interface Card (SmartNIC), which when executed cause the SmartNIC to:
receive a packet;
analyze the packet;
determine, based on the analysis, whether the packet is subject to security or not, wherein the security includes encryption or decryption of the packet;
encrypt or decrypt the packet based on a determination that the packet is subject to the security;
perform, after the encrypting or the decrypting, a class of service flow procedure on the encrypted packet or the decrypted packet; and
forward the encrypted packet or the decrypted packet towards its destination.

18. The non-transitory computer-readable storage medium of claim 17, wherein a source of the packet or the destination of the packet includes a virtual network function of a device, and wherein the device is a host device of one or multiple virtual network functions.

19. The non-transitory computer-readable storage medium of claim 18, wherein the instructions further comprise instructions, which when executed cause the SmartNIC to: perform a non-repudiation service relative to the packet.

20. The non-transitory computer-readable storage medium of claim 18, wherein the instructions further comprise instructions, which when executed cause the SmartNIC to:
generate a certificate signing request;
transmit the certificate signing request to a certificate authority device;
receive a signed certificate, which is responsive to the certificate signing request; and
establish network connections to devices external from the device and on behalf of the virtual network function based on the signed certificate.

* * * * *